United States Patent
Ma et al.

(10) Patent No.: US 11,219,003 B2
(45) Date of Patent: Jan. 4, 2022

(54) DOWNLINK CONTROL INFORMATION SENDING METHOD, DOWNLINK CONTROL INFORMATION RECEIVING METHOD, AND DEVICE

(71) Applicant: Huawei Technologies Co., Ltd., Shenzhen (CN)

(72) Inventors: Ruixiang Ma, Beijing (CN); Yongxia Lyu, Ottawa-Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 123 days.

(21) Appl. No.: 16/521,770

(22) Filed: Jul. 25, 2019

(65) Prior Publication Data

US 2019/0349910 A1    Nov. 14, 2019

Related U.S. Application Data

(63) Continuation of application No. PCT/CN2018/074057, filed on Jan. 24, 2018.

(30) Foreign Application Priority Data

Jan. 26, 2017   (CN) .......................... 201710061672.7

(51) Int. Cl.
*H04W 72/04* (2009.01)
*H04L 1/00* (2006.01)
*H04W 72/12* (2009.01)

(52) U.S. Cl.
CPC .......... *H04W 72/042* (2013.01); *H04L 1/003* (2013.01); *H04L 1/0038* (2013.01); *H04W 72/1289* (2013.01)

(58) Field of Classification Search
None
See application file for complete search history.

(56) References Cited

U.S. PATENT DOCUMENTS

2015/0029958 A1   1/2015  Park et al.
2015/0181574 A1   6/2015  Lee et al.
(Continued)

FOREIGN PATENT DOCUMENTS

CN     102594537 A    7/2012
CN     104584460 A    4/2015
(Continued)

OTHER PUBLICATIONS

Nokia et al., "Mechanism for indicating the processing time to the UE for 1ms TTI," 3GPP TSG-RAN WG1 Meeting #86, R1-167084, Gothenburg, Sweden, Aug. 22-26, 2016, 5 pages.
(Continued)

*Primary Examiner* — Alex Skripnikov
(74) *Attorney, Agent, or Firm* — Slater Matsil, LLP

(57) ABSTRACT

A network device sends configuration information to a terminal device, where the configuration information includes a scale factor corresponding to each aggregation level in a first aggregation level set; the network device sends DCI in a first DCI format to the terminal device, where an aggregation level corresponding to the DCI in the first DCI format is an aggregation level in the first aggregation level set. The terminal device receives the configuration information, determines, based on the scale factor corresponding to each aggregation level in the first aggregation level set, a quantity of candidate PDCCHs corresponding to each aggregation level in the first aggregation level set; the terminal device receives the DCI in the first DCI format based on the quantity of candidate PDCCHs corresponding to each aggregation level in the first aggregation level set.

15 Claims, 5 Drawing Sheets

(56) References Cited

U.S. PATENT DOCUMENTS

2017/0373793 A1* 12/2017 Yerramalli ............ H04L 1/0052
2018/0132245 A1*  5/2018 Yerramalli ........ H04W 72/0473

FOREIGN PATENT DOCUMENTS

| EP | 2863694 A1 | 4/2015 |
| EP | 2884678 A1 | 6/2015 |
| EP | 3244678 A1 | 11/2017 |
| JP | 2015530026 A | 10/2015 |

OTHER PUBLICATIONS

Catt, "PUSCH scheduling for Rel-14 eLAA", 3GPP TSG RAN WG1 Meeting #85, R1-164197, Nanjing, China, May 23-27, 2016, 3 pages.

\* cited by examiner

DOWNLINK CONTROL INFORMATION SENDING METHOD, DOWNLINK CONTROL INFORMATION RECEIVING METHOD, AND DEVICE

CROSS-REFERENCE TO RELATED APPLICATIONS

This application is a continuation of International Application No. PCT/CN2018/074057, filed on Jan. 24, 2018, which claims priority to Chinese Patent Application No. 201710061672.7, filed on Jan. 26, 2017. The disclosures of the aforementioned applications are hereby incorporated by reference in their entireties.

TECHNICAL FIELD

This application relates to communications technologies, and in particular, to a downlink control information sending method, a downlink control information receiving method, and a device.

BACKGROUND

In a long term evolution (LTE) system, before receiving or sending data, a terminal device needs to learn of downlink control information (DCI) configured by a base station for the terminal device. The DCI is carried on a physical downlink control channel (PDCCH).

In a current system, one or more candidate PDCCHs constitute search space. The search space includes common search space (CSS) and specific search space. The CSS is search space on which a plurality of UEs in a cell need to listen, and is usually used to transmit scheduling indication signaling used for transmitting common control information. The specific search space is search space, on which each terminal device in a cell needs to listen, of the terminal device, and is usually used to transmit scheduling indication signaling used for transmitting uplink and downlink data of a user. For the specific search space, the base station selects an appropriate PDCCH from candidate PDCCHs based on a channel state to transmit the DCI of the terminal device, and the terminal device performs blind detection on the candidate PDCCHs in the specific search space to obtain the DCI.

In the 5th generation 5G mobile communications, an ultra-reliable and low-latency communications (URLLC) service is introduced. However, the DCI in the prior art is mainly used for a conventional low-reliable enhanced mobile broadband (eMBB) service. When the existing DCI for the eMBB service is used in the URLLC service, a control channel of the URLLC service is relatively lowly reliable and cannot meet a requirement for ultra-reliable communication.

SUMMARY

This application provides a downlink control information sending method, a downlink control information receiving method, and a device, so that reliability of control channels of various services can be ensured.

According to a first aspect, this application provides a downlink control information sending method. The method includes sending, by a network device, configuration information to a terminal device, where the configuration information includes a scale factor corresponding to each aggregation level in a first aggregation level set, the first aggregation level set includes n aggregation levels, the first aggregation level set corresponds to a first downlink control information DCI format, n is a positive integer greater than or equal to 1, and the scale factor is used to determine a quantity of candidate physical downlink control channels PDCCHs of the aggregation level corresponding to the scale factor; and optionally, when to-be-scheduled data of the terminal device supports one service type, and the service type corresponds to one DCI format, the network device determines the configuration information based on the DCI format corresponding to the service type of the to-be-scheduled data supported by the terminal device. The method also includes sending, by the network device, DCI in the first DCI format to the terminal device, where an aggregation level corresponding to the DCI in the first DCI format is an aggregation level in the first aggregation level set.

In this application, first aggregation level sets corresponding to different DCI formats are configured. After the first DCI format is determined, a first aggregation level set corresponding to the first DCI format is determined, so that a reliability requirement of the service can be met.

In a possible design, the configuration information further includes information indicating the first aggregation level set.

Optionally, the information may be identification information of a first aggregation level, or the information includes values of all aggregation levels in the first aggregation level set.

In a possible design, the scale factor $P_X$ corresponding to each aggregation level in the first aggregation level set meets $0 \leq P_X \leq 1$, and a scale factor corresponding to a higher aggregation level is not greater than a scale factor corresponding to a lower aggregation level, in other words, a scale factor corresponding to an aggregation level $2^{i+1}$ is not greater than a scale factor corresponding to an aggregation level $2^i$, where i is a nonnegative integer, and a value of i includes 0; or a scale factor corresponding to a lower aggregation level is not greater than a scale factor corresponding to a higher aggregation level, in other words, a scale factor corresponding to an aggregation level $2^i$ is not greater than a scale factor corresponding to an aggregation level $2^{i+1}$, where i is a nonnegative integer, and a value of i includes 0.

In a possible design, the configuration information further includes a scale factor corresponding to each aggregation level in a second aggregation level set, the second aggregation level set includes m aggregation levels, the second aggregation level set corresponds to a second downlink control information DCI format, and m is a positive integer greater than or equal to 1.

The first DCI format is different from the second DCI format, and the n aggregation levels in the first aggregation level set are the same as the m aggregation levels in the second aggregation level set, or at least one of the n aggregation levels in the first aggregation level set is different from at least one of the m aggregation levels in the second aggregation level set.

The method further includes: sending, by the network device, DCI in the second DCI format to the terminal device, where an aggregation level corresponding to the DCI in the second DCI format is an aggregation level in the second aggregation level set.

Optionally, if the terminal device supports two service types, the terminal device needs to simultaneously detect two DCI formats, and the network device sends configuration information corresponding to the two DCI formats to the terminal device.

In a possible design, the configuration information further includes information indicating the second aggregation level set.

In a possible design, the scale factor $P_X$ corresponding to each aggregation level in the first aggregation level set meets $0 \leq P_X \leq 1$, and a scale factor corresponding to a higher aggregation level is not greater than a scale factor corresponding to a lower aggregation level, in other words, a scale factor corresponding to an aggregation level $2^{i+1}$ is not greater than a scale factor corresponding to an aggregation level $2^i$, where i is a nonnegative integer, and a value of i includes 0.

This possible design may be used for a service with a relatively low reliability requirement, so that candidate PDCCHs for the terminal device blindly detecting are concentrated at a relatively low aggregation level, in other words, a quantity of candidate PDCCHs corresponding to a lower aggregation level is greater than or equal to a quantity of candidate PDCCHs corresponding to a higher aggregation level. For example, in an aggregation level set, a quantity of to-be-blindly-detected candidate PDCCHs corresponding to a lower aggregation level is larger, and a quantity of to-be-blindly-detected candidate PDCCHs corresponding to a higher aggregation level is smaller. For example, an aggregation level set is {1, 2, 4, 8}, and quantities of to-be-blindly-detected candidate PDCCHs corresponding to aggregation levels are 6, 6, 2, and 2, respectively.

The scale factor $P_Y$ corresponding to each aggregation level in the second aggregation level set meets $0 \leq P_Y \leq 1$, and a scale factor corresponding to a lower aggregation level is not greater than a scale factor corresponding to a higher aggregation level, in other words, a scale factor corresponding to an aggregation level $2^i$ is not greater than a scale factor corresponding to an aggregation level $2^{i+1}$, where i is a nonnegative integer, and a value of i includes 0.

This possible design may be used for a service with a relatively high reliability requirement, so that candidate PDCCHs for the terminal device blindly detecting are concentrated at a relatively high aggregation level, in other words, a quantity of candidate PDCCHs corresponding to a higher aggregation level is greater than or equal to a quantity of candidate PDCCHs corresponding to a lower aggregation level. For example, in an aggregation level set, a quantity of to-be-blindly-detected candidate PDCCHs corresponding to a higher aggregation level is larger, and a quantity of to-be-blindly-detected candidate PDCCHs corresponding to a lower aggregation level is smaller. For example, an aggregation level set is {2, 4, 8, 16}, and quantities of to-be-blindly-detected candidate PDCCHs corresponding to aggregation levels are 2, 2, 6, and 6, respectively.

In a possible design, before the sending, by a network device, configuration information to a terminal device, the method further includes: determining, by the network device, the configuration information based on search space information and a blind detection capability of the terminal device, where the search space information includes an available third aggregation level set and a quantity of available candidate PDCCHs corresponding to each aggregation level in the third aggregation level set.

According to a second aspect, this application provides a downlink control information receiving method. The method includes receiving, by a terminal device, configuration information sent by a network device, where the configuration information includes a scale factor corresponding to each aggregation level in a first aggregation level set, the first aggregation level set includes n aggregation levels, the first aggregation level set corresponds to a first downlink control information DCI format, n is a positive integer greater than or equal to 1, and the scale factor is used to determine a quantity of candidate physical downlink control channels PDCCHs of the aggregation level corresponding to the scale factor. The method also includes determining, by the terminal device based on the scale factor corresponding to each aggregation level in the first aggregation level set, the quantity of candidate PDCCHs corresponding to each aggregation level in the first aggregation level set. The method also includes receiving, by the terminal device, DCI in the first DCI format based on the quantity of candidate PDCCHs corresponding to each aggregation level in the first aggregation level set.

In a possible design, the configuration information further includes information indicating the first aggregation level set.

In a possible design, the scale factor $P_X$ corresponding to each aggregation level in the first aggregation level set meets $0 \leq P_X \leq 1$, and a scale factor corresponding to a higher aggregation level is not greater than a scale factor corresponding to a lower aggregation level, or a scale factor corresponding to a lower aggregation level is not greater than a scale factor corresponding to a higher aggregation level.

In a possible design, the configuration information further includes a scale factor corresponding to each aggregation level in a second aggregation level set, the second aggregation level set includes m aggregation levels, the second aggregation level set corresponds to a second downlink control information DCI format, and m is a positive integer greater than or equal to 1.

The first DCI format is different from the second DCI format, and the n aggregation levels in the first aggregation level set are the same as the m aggregation levels in the second aggregation level set, or at least one of the n aggregation levels in the first aggregation level set is different from at least one of the m aggregation levels in the second aggregation level set.

The method further includes: determining, by the terminal device based on the scale factor corresponding to each aggregation level in the second aggregation level set, a quantity of candidate PDCCHs corresponding to each aggregation level in the second aggregation level set; and receiving, by the terminal device, DCI in the second DCI format based on the quantity of candidate PDCCHs corresponding to each aggregation level in the second aggregation level set.

In a possible design, the configuration information further includes information indicating the second aggregation level set.

In a possible design, the scale factor $P_X$ corresponding to each aggregation level in the first aggregation level set meets $0 \leq P_X \leq 1$, and a scale factor corresponding to a higher aggregation level is not greater than a scale factor corresponding to a lower aggregation level.

The scale factor $P_Y$ corresponding to each aggregation level in the second aggregation level set meets $0 \leq P_Y \leq 1$, and a scale factor corresponding to a lower aggregation level is not greater than a scale factor corresponding to a higher aggregation level.

In a possible design, the terminal device determines, based on the configuration information and search space information, a quantity of candidate PDCCHs corresponding to a first aggregation level in the first aggregation level set, where the search space information includes an available third aggregation level set and a quantity of available candidate PDCCHs corresponding to each aggregation level in the third aggregation level set.

In the first aspect and the second aspect, the following possible designs are further included.

In a possible design, the first aggregation level set is a subset of the third aggregation level set, and a quantity of candidate PDCCHs of an aggregation level i in the first aggregation level set is an integer determined based on a scale factor corresponding to the aggregation level i and a quantity of available candidate PDCCHs corresponding to an aggregation level i in the third aggregation level set.

In a possible design, both the first aggregation level set and the second aggregation level set are subsets of the third aggregation level set, a quantity of candidate PDCCHs of an aggregation level i in the first aggregation level set is an integer determined based on a scale factor corresponding to the aggregation level i and a quantity of candidate PDCCHs corresponding to an aggregation level i in the third aggregation level set, and a quantity of candidate PDCCHs of an aggregation level i in the second aggregation level set is an integer determined based on a scale factor corresponding to the aggregation level i and the quantity of candidate PDCCHs corresponding to the aggregation level i in the third aggregation level set.

In a possible design, a sum of a quantity of candidate PDCCHs corresponding to an aggregation level i in the first aggregation level set and a quantity of candidate PDCCHs corresponding to an aggregation level i in the second aggregation level set is not greater than a quantity of candidate PDCCHs corresponding to an aggregation level i in the third aggregation level set.

According to a third aspect, this application provides a network device. The network device includes a sending module, configured to send configuration information to a terminal device, where the configuration information includes a scale factor corresponding to each aggregation level in a first aggregation level set, the first aggregation level set includes n aggregation levels, the first aggregation level set corresponds to a first downlink control information DCI format, n is a positive integer greater than or equal to 1, and the scale factor is used to determine a quantity of candidate physical downlink control channels PDCCHs of the aggregation level corresponding to the scale factor. The sending module is further configured to send DCI in the first DCI format to the terminal device, where an aggregation level corresponding to the DCI in the first DCI format is an aggregation level in the first aggregation level set.

In a possible design, the configuration information further includes information indicating the first aggregation level set.

In a possible design, the scale factor $P_X$ corresponding to each aggregation level in the first aggregation level set meets $0 \le P_X \le 1$, and a scale factor corresponding to a higher aggregation level is not greater than a scale factor corresponding to a lower aggregation level, or a scale factor corresponding to a lower aggregation level is not greater than a scale factor corresponding to a higher aggregation level.

In a possible design, the configuration information further includes a scale factor corresponding to each aggregation level in a second aggregation level set, the second aggregation level set includes m aggregation levels, the second aggregation level set corresponds to a second downlink control information DCI format, and m is a positive integer greater than or equal to 1.

The first DCI format is different from the second DCI format, and the n aggregation levels in the first aggregation level set are the same as the m aggregation levels in the second aggregation level set, or at least one of the n aggregation levels in the first aggregation level set is different from at least one of the m aggregation levels in the second aggregation level set.

The sending module is further configured to send DCI in the second DCI format to the terminal device, where an aggregation level corresponding to the DCI in the second DCI format is an aggregation level in the second aggregation level set.

In a possible design, the configuration information further includes information indicating the second aggregation level set.

In a possible design, the scale factor $P_X$ corresponding to each aggregation level in the first aggregation level set meets $0 \le P_X \le 1$, and a scale factor corresponding to a higher aggregation level is not greater than a scale factor corresponding to a lower aggregation level.

The scale factor $P_Y$ corresponding to each aggregation level in the second aggregation level set meets $0 \le P_Y \le 1$, and a scale factor corresponding to a lower aggregation level is not greater than a scale factor corresponding to a higher aggregation level.

In a possible design, the network device further includes: a processing module, configured to determine the configuration information based on search space information and a blind detection capability of the terminal device, where the search space information includes an available third aggregation level set and a quantity of available candidate PDCCHs corresponding to each aggregation level in the third aggregation level set.

According to a fourth aspect, this application provides a terminal device. The terminal device includes a receiving module, configured to receive configuration information sent by a network device, where the configuration information includes a scale factor corresponding to each aggregation level in a first aggregation level set, the first aggregation level set includes n aggregation levels, the first aggregation level set corresponds to a first downlink control information DCI format, n is a positive integer greater than or equal to 1, and the scale factor is used to determine a quantity of candidate physical downlink control channels PDCCHs of the aggregation level corresponding to the scale factor. The terminal device also includes a processing module, configured to determine, based on the scale factor corresponding to each aggregation level in the first aggregation level set, the quantity of candidate PDCCHs corresponding to each aggregation level in the first aggregation level set. The receiving module is further configured to receive DCI in the first DCI format based on the quantity of candidate PDCCHs corresponding to each aggregation level in the first aggregation level set.

In a possible design, the configuration information further includes information indicating the first aggregation level set.

In a possible design, the scale factor $P_X$ corresponding to each aggregation level in the first aggregation level set meets $0 \le P_X \le 1$, and a scale factor corresponding to a higher aggregation level is not greater than a scale factor corresponding to a lower aggregation level, or a scale factor corresponding to a lower aggregation level is not greater than a scale factor corresponding to a higher aggregation level.

In a possible design, the configuration information further includes a scale factor corresponding to each aggregation level in a second aggregation level set, the second aggregation level set includes m aggregation levels, the second aggregation level set corresponds to a second downlink control information DCI format, and m is a positive integer greater than or equal to 1.

The first DCI format is different from the second DCI format, and the n aggregation levels in the first aggregation level set are the same as the m aggregation levels in the second aggregation level set, or at least one of the n aggregation levels in the first aggregation level set is different from at least one of the m aggregation levels in the second aggregation level set.

The processing module is further configured to determine, based on the scale factor corresponding to each aggregation level in the second aggregation level set, a quantity of candidate PDCCHs corresponding to each aggregation level in the second aggregation level set.

The receiving module is further configured to receive DCI in the second DCI format based on the quantity of candidate PDCCHs corresponding to each aggregation level in the second aggregation level set.

In a possible design, the configuration information further includes information indicating the second aggregation level set.

In a possible design, the scale factor $P_X$ corresponding to each aggregation level in the first aggregation level set meets $0 \leq P_X \leq 1$, and a scale factor corresponding to a higher aggregation level is not greater than a scale factor corresponding to a lower aggregation level. The scale factor $P_Y$ corresponding to each aggregation level in the second aggregation level set meets $0 \leq P_Y \leq 1$, and a scale factor corresponding to a lower aggregation level is not greater than a scale factor corresponding to a higher aggregation level.

In a possible design, the processing module is further configured to determine, based on the configuration information and search space information, a quantity of candidate PDCCHs corresponding to a first aggregation level in the first aggregation level set, where the search space information includes an available third aggregation level set and a quantity of available candidate PDCCHs corresponding to each aggregation level in the third aggregation level set.

According to a fifth aspect, this application provides a downlink control information sending apparatus, including at least one processor and a memory, where the memory stores a computer execution instruction; and the at least one processor executes the computer execution instruction stored in the memory, so that the apparatus performs the downlink control information sending method according to the first aspect and the various possible designs in the first aspect.

According to a sixth aspect, this application provides a downlink control information receiving apparatus, including at least one processor and a memory, where the memory stores a computer execution instruction; and the at least one processor executes the computer execution instruction stored in the memory, so that the apparatus performs the downlink control information receiving method according to the second aspect and the various possible designs in the second aspect.

According to a seventh aspect, this application provides a computer readable storage medium, where the computer readable storage medium stores a computer execution instruction, and when a processor executes the computer execution instruction, the downlink control information sending method provided in the first aspect and the various possible designs in the first aspect is implemented.

According to an eighth aspect, this application provides a computer readable storage medium, where the computer readable storage medium stores a computer execution instruction, and when a processor executes the computer execution instruction, the downlink control information receiving method provided in the second aspect and the various possible designs in the second aspect is implemented.

According to a ninth aspect, this application provides a computer program product including an instruction, where when the computer program product runs on a network device, the network device performs the downlink control information sending method provided in the first aspect and the various possible designs in the first aspect.

According to a tenth aspect, this application provides a computer program product including an instruction, where when the computer program product runs on a terminal device, the terminal device performs the downlink control information receiving method provided in the second aspect and the various possible designs in the second aspect.

According to the downlink control information sending method and the downlink control information receiving method provided in the embodiments, the network device determines the first DCI format based on the service type, and then determines the first aggregation level set corresponding to the first DCI format, in other words, the network device specially determines the first aggregation level set corresponding to the first DCI format, so that aggregation levels and quantities of candidate PDCCHs are specially configured for blind detection for different services, to adapt to reliability requirements of communications services. The network device sends the configuration information to the terminal device. The configuration information includes the scale factor corresponding to each aggregation level in the first aggregation level set, and the first aggregation level set corresponds to the first DCI format. The terminal device determines, based on the configuration information for the first DCI format, the quantity of candidate PDCCHs corresponding to each aggregation level; and when the network device sends the DCI in the first DCI format, performs blind detection based on the quantity of candidate PDCCHs corresponding to each aggregation level. Because the configuration information is determined by the network device based on the first DCI format, and the first DCI format corresponds to the service type, PDCCH reliability can be ensured.

DETAILED DESCRIPTION OF ILLUSTRATIVE EMBODIMENTS

A network architecture and a service scenario described in the embodiments of this application are intended to more clearly describe the technical solutions in the embodiments of this application, but are not intended to limit the technical solutions provided in the embodiments of this application. A person of ordinary skill in the art may know that as the network architecture evolves and a new service scenario emerges, the technical solutions provided in the embodiments of this application are also applicable to a similar technical problem.

Figure 1:
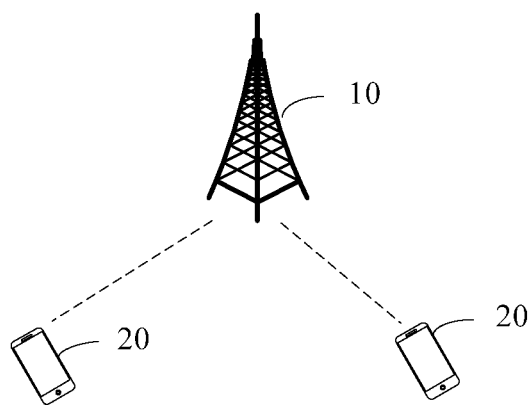
FIG. 1 shows a network architecture to which an embodiment of this application is applicable.

The following describes a possible network architecture according to an embodiment of this application with reference to FIG. 1. FIG. 1 shows a network architecture to which an embodiment of this application is applicable. As shown in FIG. 1, the network architecture provided in this embodiment includes a network device 10 and a terminal device 20.

The network device 10 is a device that connects a terminal device and a wireless network, and may be a base transceiver station (BTS for short) in a global system for mobile communications (GSM for short) or a code division multiple access (CDMA for short) system, or may be a NodeB (NB for short) in a wideband code division multiple access (WCDMA for short) system, or may be an evolved NodeB (eNB or eNodeB for short) in a long term evolution (LTE for short) system, a relay station, an access point, or a base station in a future 5G network. This is not limited herein. FIG. 1 shows a possible example in which the network device is a base station.

The terminal device 20 may be a wireless terminal or a wired terminal. The wireless terminal may be a device that provides a user with voice and/or other service data connectivity, a handheld device with a wireless connection function, or another processing device connected to a wireless modem. The wireless terminal may communicate with one or more core networks through a radio access network (RAN for short). The wireless terminal may be a mobile terminal, such as a mobile phone (or referred to as a "cellular" phone) and a computer with a mobile terminal, for example, may be a portable, pocket-sized, handheld, computer built-in, or in-vehicle mobile apparatus, which exchanges voice and/or data with the radio access network. For example, the wireless terminal may be a device such as a personal communications service (PCS for short) phone, a cordless telephone set, a session initiation protocol (SIP for short) phone, a wireless local loop (WLL for short) station, or a personal digital assistant (PDA for short). The wireless terminal may also be referred to as a system, a subscriber unit, a subscriber station, a mobile station, a mobile console, a remote station, a remote terminal, an access terminal, a user terminal, a user agent. This is not limited herein. FIG. 1 shows a possible example in which the terminal device is a mobile phone. In a wireless communications system, data channels of the terminal device include a physical downlink shared channel (PDSCH) used to transmit downlink data and a physical uplink shared channel (PUSCH) used to transmit uplink data. Scheduling of uplink and downlink resources of the data channels needs to be notified to the terminal device by using downlink control information (DCI). The DCI is carried by using a physical downlink control channel (PDCCH).

In an LTE system, a time-frequency resource allocated to a PDCCH is divided into a plurality of control channel elements (CCE). The CCE is a smallest unit for forming the PDCCH. The PDCCH may be formed by aggregating L CCEs, where L is referred to as an aggregation level (AL). The network device selects an appropriate aggregation level based on a channel state to transmit a PDCCH of the terminal device, and DCI is carried on the PDCCH. The terminal device performs blind detection on candidate PDCCHs in specific search space by using a specific scrambling code of the terminal device, to obtain the DCI.

In a new radio access technology (NR) of the 5th generation mobile communications (5G), three typical 5G services include enhanced mobile broadband (eMBB), massive machine-type communications, and ultra-reliable and low-latency communications (URLLC). Scenarios corresponding to the URLLC include unmanned driving, industrial control, and the like. These application scenarios raise more strict requirements for reliability and a latency.

Specific requirements for the URLLC service include: Transmission reliability reaches 99.999%, and a transmission latency is less than 1 ms. To meet the reliability requirement, reliability of a control channel for a URLLC user needs to be improved. To meet the latency requirement, a cycle in which the terminal device with the URLLC service monitors the control channel is shorter. However, the eMBB service is a conventional service, and has lower reliability and latency requirements than the URLLC service. Therefore, a reliability requirement for a control channel is lower, and a cycle in which a user monitors the control channel is longer. Therefore, a DCI format for the URLLC service is different from a DCI format for the eMBB service, and cycles in which the users monitor DCI in different formats are also different.

The URLLC service is introduced to a 5G service. However, a downlink control information sending method and a downlink control information receiving method in the prior art cannot meet requirements for high reliability and a low latency of a control channel of the URLLC service. In this application, a downlink control information sending method and a downlink control information receiving method are provided, and are applicable to both the eMBB service and the URLLC service.

First, it should be noted that for ease of description in the embodiments, aggregation level sets are distinguished by using terms first, second, and third. A first aggregation level set and a second aggregation level set are two aggregation level sets corresponding to DCI formats with different reliability requirements. A third aggregation level set is an available aggregation level set.

The following describes in detail, by using detailed embodiments, the downlink control information sending method and the downlink control information receiving method provided in this application.

Figure 2:
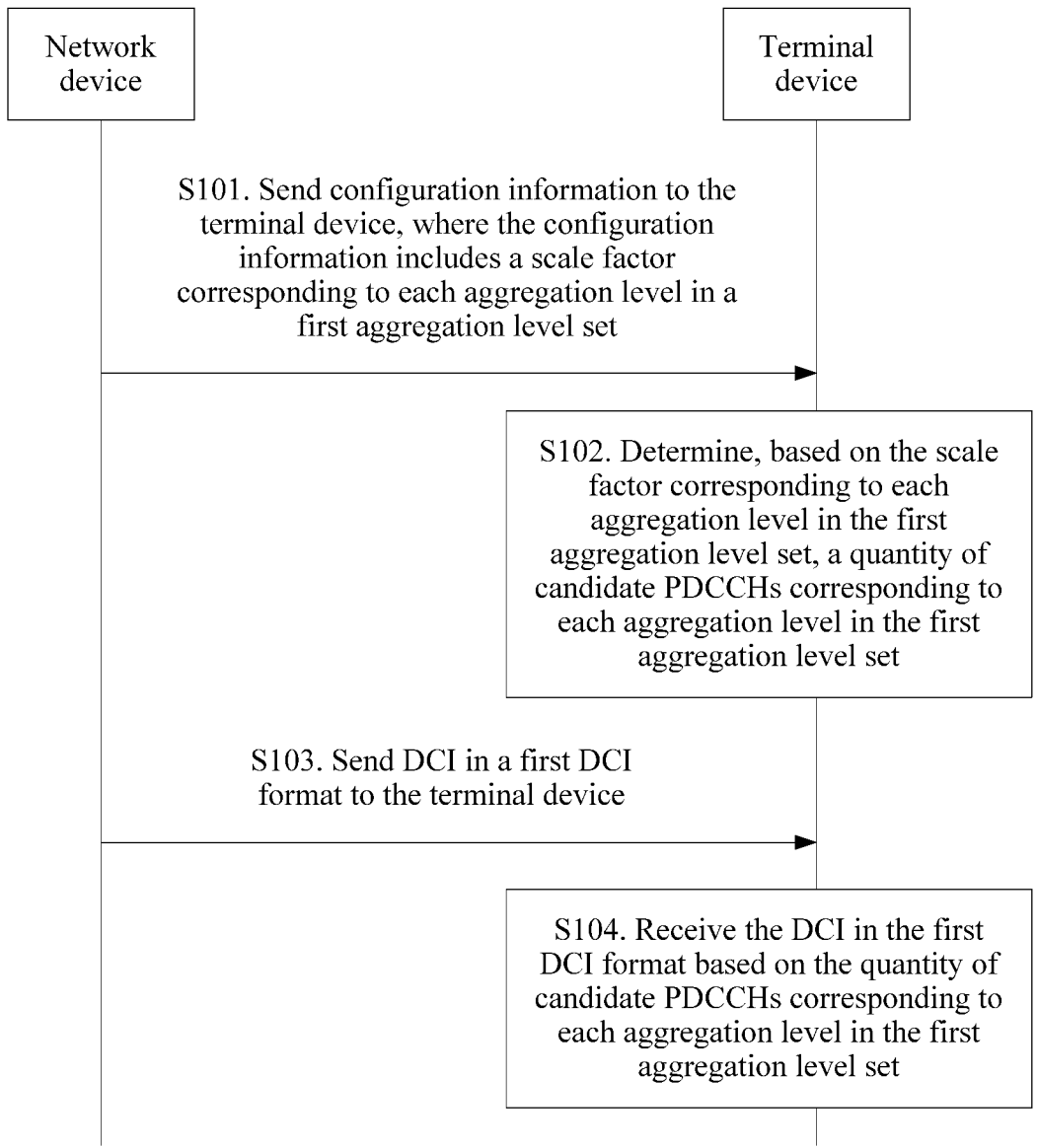
FIG. 2 is a signaling flowchart 1 of a downlink control information transmission method according to an embodiment of this application.

FIG. 2 is a signaling flowchart of a downlink control information transmission method according to an embodiment of this application. As shown in FIG. 2, the method includes the following steps.

S101. A network device sends configuration information to a terminal device, where the configuration information includes a scale factor corresponding to each aggregation level in a first aggregation level set.

In this embodiment, a service type of to-be-scheduled data of the terminal device has a correspondence with a DCI format. In this embodiment, the to-be-scheduled data of the terminal device may be uplink data or downlink data. The service type of the to-be-scheduled data may be an eMBB service, a URLLC service, or another service type. A person skilled in the art may understand that if the terminal device currently supports one service type, for the service type, a base station configures configuration information corresponding to a DCI format for the terminal device, and the DCI format is referred to as a first DCI format. When there are a plurality of terminal devices, the base station configures configuration information corresponding to a first DCI format for each terminal device based on a service type corresponding to to-be-scheduled data of each terminal device.

The network device sends the configuration information to the terminal device that currently supports one DCI format. The configuration information includes the scale factor corresponding to each aggregation level in the first aggregation level set. The first aggregation level set includes n aggregation levels, the first aggregation level set corresponds to the first DCI format, n is a positive integer greater than or equal to 1, and the scale factor is used to determine a quantity of candidate physical downlink control channels PDCCHs of the aggregation level corresponding to the scale factor. For a same aggregation level, a greater scale factor corresponds to a larger quantity of candidate PDCCHs.

Optionally, a DCI format has a correspondence with a first aggregation level set. The network device may determine, based on the correspondence, a first aggregation level set corresponding to a first DCI format, and then determine a scale factor corresponding to each aggregation level in the first aggregation level set.

In this embodiment, an eMBB service and a URLLC service are used as examples for description. For ease of description, if a service type is the eMBB service, a corresponding first DCI format is referred to as a DCI format X, and a corresponding scale factor is $P_X$; or if a service type is the URLLC service, a corresponding first DCI format is referred to as a DCI format Y, and a corresponding scale factor is $P_Y$.

When a service type currently supported by the terminal device is the eMBB service, a first DCI format corresponding to the service type is a DCI format X, and a scale factor corresponding to each aggregation level corresponding to the terminal device is shown in Table 1. In Table 1, a first column represents a first aggregation level set, and a second column represents a scale factor corresponding to each aggregation level.

TABLE 1

| Aggregation level L | Scale factor $P_X$ |
| --- | --- |
| 1 | $a_0$ |
| 2 | $a_1$ |
| 4 | $a_2$ |
| 8 | $a_3$ |
| 16 | $a_4$ |

As shown in Table 1, the first aggregation level set includes aggregation levels 1, 2, 4, 8, and 16.

For the terminal device with the eMBB service, because a reliability requirement for a control channel of the eMBB service is relatively low, the aggregation level in the aggregation level set configured for the terminal device is relatively low, and candidate PDCCHs for the terminal device blindly detecting are concentrated at the relatively low aggregation level. The "aggregation level is relatively low" is a relative concept that is relative to an aggregation level of the terminal device that has a high reliability requirement. Optionally, a scale factor corresponding to a higher aggregation level is not greater than a scale factor corresponding to a lower aggregation level, in other words, a scale factor corresponding to an aggregation level $2^{i+1}$ is not greater than a scale factor corresponding to an aggregation level $2^i$, where i is a nonnegative integer, and a value of i includes 0. For example, the higher aggregation level is a higher aggregation level in two aggregation levels in the first aggregation level set, and the lower aggregation level is a lower aggregation level. For example, the first aggregation level set is {1, 2, 4, 8, 16}. In this case, a scale factor corresponding to an aggregation level 4 is not greater than a scale factor corresponding to an aggregation level 2, and a scale factor corresponding to an aggregation level 16 is not greater than a scale factor corresponding to an aggregation level 8. For Table 1, $a_0 \geq a_1 \geq a_2 \geq a_3 \geq a_4$.

When a service type currently supported by the terminal device is the URLLC service, a first DCI format corresponding to the service type is a DCI format Y, and a scale factor corresponding to each aggregation level corresponding to the terminal device is shown in Table 2. A first column represents a first aggregation level set, and a second column represents a scale factor corresponding to each aggregation level.

TABLE 2

| Aggregation level L | Scale factor $P_Y$ |
| --- | --- |
| 2 | $b_1$ |
| 4 | $b_2$ |
| 8 | $b_3$ |
| 16 | $b_4$ |
| 32 | $b_5$ |

As shown in Table 2, the first aggregation level set includes aggregation levels 2, 4, 8, 16, and 32.

For the terminal device with only the URLLC service, because a reliability requirement for a control channel of the URLLC service is relatively high, the aggregation level in the aggregation level set configured for the terminal device is relatively high, and candidate PDCCHs for the terminal device blindly detecting are concentrated at the relatively high aggregation levels. The "aggregation level is relatively high" is a relative concept that is relative to an aggregation level of a terminal device that has a low reliability requirement. Optionally, a scale factor corresponding to a lower aggregation level is not greater than a scale factor corresponding to a higher aggregation level, in other words, a scale factor corresponding to an aggregation level $2^i$ is not greater than a scale factor corresponding to an aggregation level $2^{i+1}$, where i is a nonnegative integer, and a value of i includes 0. For Table 2, $b_1 \leq b_2 \leq b_3 \leq b_4 \leq b_5$. For concepts of the higher aggregation level and the lower aggregation level, refer to the foregoing embodiment. Details are not described herein again in this embodiment. For example, the aggregation level set is {2, 4, 8, 16, 32}. In this case, a scale factor corresponding to an aggregation level 2 is not greater than a scale factor corresponding to an aggregation level 8, and a scale factor corresponding to an aggregation level 16 is not greater than a scale factor corresponding to an aggregation level 32.

It can be learned from the foregoing description that in this application, for a terminal device with different service types, first aggregation level sets corresponding to DCI formats of the different service types are configured. After a service type of the terminal device is determined, a first aggregation level set corresponding to a first DCI format of the service type is determined, so that a reliability requirement of the service can be met.

After determining the configuration information, the network device sends the configuration information to the terminal device. The configuration information includes the scale factor corresponding to each aggregation level in the first aggregation level set. Specifically, the network device may send the configuration information to the terminal device by using higher layer signaling. The configuration information may be semi-static information, to be specific, is valid within a time period, or the configuration information may be static information, to be specific, is valid for a relatively long time. In other words, the network device may send a plurality of pieces of DCI for same configuration information. Optionally, for the scale factors in the configuration information, a base station may sort the scale factors corresponding to the aggregation levels in ascending order of the aggregation levels, to be specific, in order of the aggregation levels 1, 2, 4, 8, 16, 32, and the like. For example, for the first aggregation level set shown in Table 1, the scale factors in the configuration information are sorted into $a_0$, $a_1$, $a_2$, $a_3$, and $a_4$. For the first aggregation level set shown in Table 2, the scale factors in the configuration information are sorted into 0, $b_1$, $b_2$, $b_3$, $b_4$, and $b_5$, where 0 indicates that a scale factor corresponding to an aggregation level 1 is 0. In this way, the terminal device can obtain, based on the sorting, the scale factor corresponding to each aggregation level, without needing the network device to indicate the first aggregation level set to the terminal device.

Optionally, the configuration information further includes information indicating the first aggregation level set. Specifically, the information may be identification information of the first aggregation level set. Different first aggregation level sets have different identification information. For example, for the first aggregation level set shown in Table 1, the identification information may be, for example, a group 1, the first aggregation level set indicated by the group 1 includes the aggregation levels 1, 2, 4, 8, and 16, and the scale factors are sorted into $a_0$, $a_1$, $a_2$, $a_3$, and $a_4$, which sequentially correspond to the aggregation levels that are in ascending order. For the first aggregation level set shown in Table 2, the identification information may be, for example, a group 2, the first aggregation level set indicated by the group 2 includes the aggregation levels 2, 4, 8, 16, and 32, and the scale factors are sorted into $b_1$, $b_2$, $b_3$, $b_4$, and $b_5$, which sequentially correspond to the aggregation levels that are in ascending order.

Alternatively, the information includes values of all the aggregation levels in the first aggregation level set. For example, for a terminal device with the eMBB service, an implementation of the configuration information is shown in Table 1; and for a terminal device with the URLLC service, an implementation of the configuration information is shown in Table 2. In this embodiment, several implementations of the information indicating the first aggregation level set are illustrated. Other implementations of information that can indicate the first aggregation level set may also be applied to this embodiment. This is not specially limited herein in this embodiment.

S102. The terminal device determines, based on the scale factor corresponding to each aggregation level in the first aggregation level set, a quantity of candidate PDCCHs corresponding to each aggregation level in the first aggregation level set.

After receiving the configuration information, the terminal device obtains, based on the configuration information, the scale factor corresponding to each aggregation level in the first aggregation level set. It can be learned from the foregoing description that the terminal device may obtain, in ascending order of the aggregation levels based on the order of the scale factors in the configuration information, the scale factor corresponding to each aggregation level. Optionally, the terminal device may obtain, based on the information that is included in the configuration information and that indicates the first aggregation level set, the scale factor corresponding to each aggregation level.

Then, the terminal device determines, based on the scale factor corresponding to each aggregation level in the first aggregation level set, the quantity of candidate PDCCHs corresponding to each aggregation level in the first aggregation level set.

Optionally, in a possible implementation, the scale factor corresponding to each aggregation level has a correspondence with the quantity of candidate PDCCHs corresponding to the aggregation level. The terminal device may obtain, based on the scale factor and the correspondence, the quantity of candidate PDCCHs corresponding to each aggregation level. Table 2 is used as an example. A quantity of candidate PDCCHs corresponding to $b_1$ is $M_{real-1}$, a quantity of candidate PDCCHs corresponding to $b_2$ is $M_{real-2}$, a quantity of candidate PDCCHs corresponding to $b_3$ is $M_{real-3}$, a quantity of to-be-blindly-detected candidate PDCCHs corresponding to $b_4$ is $M_{real-4}$, and a quantity of to-be-blindly-detected candidate PDCCHs corresponding to $b_5$ is $M_{real-5}$.

A person skilled in the art can understand that the quantity of candidate PDCCHs corresponding to each aggregation level is a quantity of blind detection times. Therefore, at an aggregation level 2, blind detection is performed $M_{real-1}$ times; at an aggregation level 4, blind detection is performed $M_{real-2}$ times; at an aggregation level 8, blind detection is performed $M_{real-4}$ times; at an aggregation level 16, blind detection is performed $M_{real-4}$ times; and at an aggregation level 32, blind detection is performed $M_{real-5}$ times.

S103. The network device sends DCI in a first DCI format to the terminal device.

An aggregation level corresponding to the DCI in the first DCI format is an aggregation level in the first aggregation level set. A person skilled in the art can understand that the aggregation level corresponding to the first DCI format is an aggregation level in the first aggregation level set.

S104. The terminal device receives the DCI in the first DCI format based on the quantity of candidate PDCCHs corresponding to each aggregation level in the first aggregation level set.

A person skilled in the art can understand that when sending the DCI in the first DCI format to the terminal device, the network device does not know whether the terminal device has determined the quantity of candidate PDCCHs corresponding to each aggregation level, and the terminal device does not know whether the network device has sent the DCI in the first DCI format, but obtains the DCI through blind detection. Therefore, for the network device and the terminal device alone, there is no strict time sequence relationship between S102 and S103.

After the terminal device determines the quantity of candidate PDCCHs corresponding to each aggregation level, and the network device sends the DCI in the first DCI format to the terminal device, the terminal device performs blind detection based on the quantity of candidate PDCCHs corresponding to each aggregation level in the first aggregation level set, to receive the DCI in the first DCI format.

According to the downlink control information sending method and the downlink control information receiving method provided in this embodiment, the network device determines the first DCI format of the terminal device based on the service type of the terminal device, and then determines the first aggregation level set corresponding to the first DCI format, in other words, the network device specially determines the first aggregation level set corresponding to the first DCI format, so that aggregation levels and quantities of candidate PDCCHs are specially configured for blind detection for different services, to adapt to reliability requirements of communications services. The network device sends the configuration information to the terminal device. The configuration information includes the scale factor corresponding to each aggregation level in the first aggregation level set, and the first aggregation level set corresponds to the first DCI format. The terminal device determines, based on the configuration information for the first DCI format, the quantity of candidate PDCCHs corresponding to each aggregation level; and when the network device sends the DCI in the first DCI format, performs blind detection based on the quantity of candidate PDCCHs corresponding to each aggregation level. Because the configuration information is determined by the network device based on the first DCI format, and the first DCI format corresponds to the service type, PDCCH reliability can be ensured.

Based on the foregoing embodiment, the following describes, by using specific embodiments, an implementation process in which the network device determines the configuration information and an implementation in which the terminal device determines the quantity of candidate PDCCHs based on the configuration information.

An implementation on a network device side is first described. Specifically, the network device determines, based on search space information and a blind detection capability of the terminal device, the configuration information corresponding to the first DCI format. The search space information includes an available third aggregation level set and a quantity of available candidate PDCCHs corresponding to each aggregation level in the third aggregation level set.

Optionally, the terminal device may report the blind detection capability of the terminal device to the network device. The blind detection capability of the terminal device may be specifically a maximum quantity of blind detection times of the terminal device.

The search space information may be a preset available third aggregation level set and a preset quantity of available candidate PDCCHs corresponding to each aggregation level in the third aggregation level set. The search space information is the same and preconfigured for both the network device and the terminal device. The preset search space information may be predefined in various communications protocols. Table 3 shows a possible implementation of the search space information.

TABLE 3

| Aggregation level L | Quantity $M^{(L)}$ of available candidate PDCCHs |
| --- | --- |
| 1 | $M_0$ |
| 2 | $M_1$ |
| 4 | $M_2$ |
| 8 | $M_3$ |
| 16 | $M_4$ |
| 32 | $M_5$ |
| ... | ... |

As shown in Table 3, the third aggregation level set includes aggregation levels 1, 2, 4, 8, 16, 32, . . . , and $2^{m-1}$, where m is equal to 1, 2, 3, 4, or the like.

It can be learned from the foregoing description that different DCI formats correspond to different aggregation level sets. For example, for a format X, the first aggregation level set includes aggregation levels 1, 2, 4, 8, and 16. For a format Y, the first aggregation level set includes aggregation levels 2, 4, 8, 16, and 32. In other words, the first aggregation level set is a proper subset of the third aggregation level set.

The network device determines, based on the search space information and the blind detection capability of the terminal device, the configuration information corresponding to the first DCI format, to be specific, determines the scale factor corresponding to each aggregation level, so that a total quantity of blind detection times of the terminal device is not greater than the blind detection capability of the terminal device.

Optionally, a quantity of candidate PDCCHs of an aggregation level i in the first aggregation level set is an integer determined based on a scale factor corresponding to the aggregation level i and a quantity of available candidate PDCCHs corresponding to an aggregation level i in the third aggregation level set. Specifically, a quantity of candidate PDCCHs that actually need to be blindly detected at each aggregation level may be obtained by using any one of the following formula 1 to formula 3.

$$M_{real}(L,\text{format})=\text{round}\{p(L,\text{format})\times M^{(L)}\} \quad \text{Formula 1}$$

$$M_{real}(L,\text{format})=\lfloor p(L,\text{format})\times M^{(L)}\rfloor \quad \text{Formula 2}$$

$$M_{real}(L,\text{format})=\lceil p(L,\text{format})\times M^{(L)}\rceil \quad \text{Formula 3}$$

where $M_{real}(L, \text{format})$ is the quantity of candidate PDCCHs that actually need to be blindly detected at each aggregation level in the first DCI format, $p(L, \text{format})$ represents the scale factor corresponding to the aggregation level i, and $M^{(L)}$ is a quantity of available candidate PDCCHs corresponding to the aggregation level L in third aggregation level set, round represents rounding off, $\lfloor \ \rfloor$ represents rounding down, and $\lceil \ \rceil$ represents rounding up.

Based on this, the total quantity that is of blind detection times and that corresponds to the first aggregation level set further needs to be not greater than the blind detection capability of the terminal device. Specifically, for the format X in Table 1, the following constraint is met:

$$\text{round}(a_0 \times M_0)+\text{round}(a_1 \times M_1)+\text{round}(a_2 \times M_2)+\text{round}(a_3 \times M_3)+\text{round}(a_4 \times M_4) \leq N; \text{ or}$$

$$\lfloor a_0 \times M_0 \rfloor + \lfloor a_1 \times M_1 \rfloor + \lfloor a_2 \times M_2 \rfloor + \lfloor a_3 \times M_3 \rfloor + \lfloor a_4 \times M_4 \rfloor \leq N; \text{ or}$$

$$\lceil a_0 \times M_0 \rceil + \lceil a_1 \times M_1 \rceil + \lceil a_2 \times M_2 \rceil + \lceil a_3 \times M_3 \rceil + \lceil a_4 \times M_4 \rceil \leq N,$$

where N is the maximum quantity of blind detection times of the terminal device. On a basis that the foregoing formula is met, the network device may solve the scale factor corresponding to each first aggregation level. Optionally, the network device may alternatively solve, with reference to a constraint $a_0 \leq a_1 \leq a_2 \leq a_3 \leq a_4$, the scale factor corresponding to each aggregation level.

For the format Y in Table 2, the following constraint is met:

$$\text{round}(b_1 \times M_1)+\text{round}(b_2 \times M_2)+\text{round}(b_3 \times M_3)+\text{round}(b_4 \times M_4)+\text{round}(b_5 \times M_5) \leq N; \text{ or}$$

$$\lfloor b_1 \times M_1 \rfloor + \lfloor b_2 \times M_2 \rfloor + \lfloor b_3 \times M_3 \rfloor + \lfloor b_4 \times M_4 \rfloor + \lfloor b_5 \times M_5 \rfloor \leq N; \text{ or}$$

$$\lceil b_1 \times M_1 \rceil + \lceil b_2 \times M_2 \rceil + \lceil b_3 \times M_3 \rceil + \lceil b_4 \times M_4 \rceil + \lceil b_5 \times M_5 \rceil \leq N,$$

where N is the maximum quantity of blind detection times of the terminal device. On a basis that the foregoing formula is met, the network device may solve the scale factor corresponding to each aggregation level. Optionally, the network device may alternatively solve, with reference to a constraint $b_1 \leq b_2 \leq b_3 \leq b_4 \leq b_5$, the scale factor corresponding to each aggregation level.

A person skilled in the art can understand that the scale factor that corresponds to each aggregation level and that is ultimately solved by the network device may not be unique, and the network device may select a specific scale factor according to a preset rule.

In this way, the network device determines the scale factor corresponding to each aggregation level in the first aggregation level set, and accordingly determines the configuration information sent to the terminal device.

The following describes an implementation process in which a terminal device side receives the DCI in the first DCI format after receiving the configuration information.

After receiving the configuration information, the terminal device obtains, based on the configuration information, the quantity of candidate PDCCHs corresponding to each aggregation level. If the first DCI format is the format X, a possible implementation of the configuration information is shown in Table 1. If the first DCI format is the format Y, a possible implementation of the configuration information is shown in Table 2.

The terminal device determines, based on the configuration information and the search space information, the quantity of candidate PDCCHs corresponding to the aggregation level in the first aggregation level set. Specifically, a quantity of candidate PDCCHs of an aggregation level i in the first aggregation level set is an integer determined based on a scale factor corresponding to the aggregation level i and a quantity of available candidate PDCCHs corresponding to an aggregation level i in the third aggregation level set.

For example, for the format X, an implementation of the quantity of candidate PDCCHs corresponding to each aggregation level may be shown in Table 4.

TABLE 4

| Aggregation level L | Scale factor $P_X$ | Quantity of candidate PDCCHs |
|---|---|---|
| 1 | $a_0$ | round $(a_0 \times M_0)$ or $\lfloor a_0 \times M_0 \rfloor$ or $\lceil a_0 \times M_0 \rceil$ |
| 2 | $a_1$ | round $(a_1 \times M_1)$ or $\lfloor a_1 \times M_1 \rfloor$ or $\lceil a_1 \times M_1 \rceil$ |
| 4 | $a_2$ | round $(a_2 \times M_2)$ or $\lfloor a_2 \times M_2 \rfloor$ or $\lceil a_2 \times M_2 \rceil$ |
| 8 | $a_3$ | round $(a_3 \times M_3)$ or $\lfloor a_3 \times M_3 \rfloor$ or $\lceil a_3 \times M_3 \rceil$ |
| 16 | $a_4$ | round $(a_4 \times M_4)$ or $\lfloor a_4 \times M_4 \rfloor$ or $\lceil a_4 \times M_4 \rceil$ |

For the format Y, an implementation of the quantity of candidate PDCCHs corresponding to each aggregation level may be shown in Table 5.

TABLE 5

| Aggregation level L | Scale factor $P_Y$ | Quantity of to-be-blindly-detected candidate PDCCHs |
|---|---|---|
| 2 | $b_1$ | round $(b_1 \times M_1)$ or $\lfloor b_1 \times M_1 \rfloor$ or $\lceil b_1 \times M_1 \rceil$ |
| 4 | $b_2$ | round $(b_2 \times M_2)$ or $\lfloor b_2 \times M_2 \rfloor$ or $\lceil b_2 \times M_2 \rceil$ |
| 8 | $b_3$ | round $(b_3 \times M_3)$ or $\lfloor b_3 \times M_3 \rfloor$ or $\lceil b_3 \times M_3 \rceil$ |
| 16 | $b_4$ | round $(b_4 \times M_4)$ or $\lfloor b_4 \times M_4 \rfloor$ or $\lceil b_4 \times M_4 \rceil$ |
| 32 | $b_5$ | round $(b_5 \times M_5)$ or $\lfloor b_5 \times M_5 \rfloor$ or $\lceil b_5 \times M_5 \rceil$ |

After the terminal device obtains the quantity of candidate PDCCHs corresponding to each aggregation level, and the network device sends the DCI in the first DCI format, the terminal device performs blind detection to receive the DCI in the first DCI format. Specifically, a specific quantity of times the terminal device performs blind detection for each aggregation level is the same as a specific quantity of candidate PDCCHs corresponding to the aggregation level.

In this embodiment, when the terminal device supports both the URLLC service and the eMBB service, because blind detection cycles of the two services are different, at a specific moment, blind detection may need to be simultaneously performed on a PDCCH of the URLLC service and a PDCCH of the eMBB service. However, the blind detection capability (the total quantity of blind detection times) of the terminal device is definite. Therefore, to ensure a reliability requirement for a control channel of the URLLC service and ensure that a control channel of the eMBB service can be monitored, how to properly allocate the quantity of blind detection times of the terminal device is a problem that needs to be resolved in this application. The following provides detailed description with reference to FIG. 3.

Figure 3:
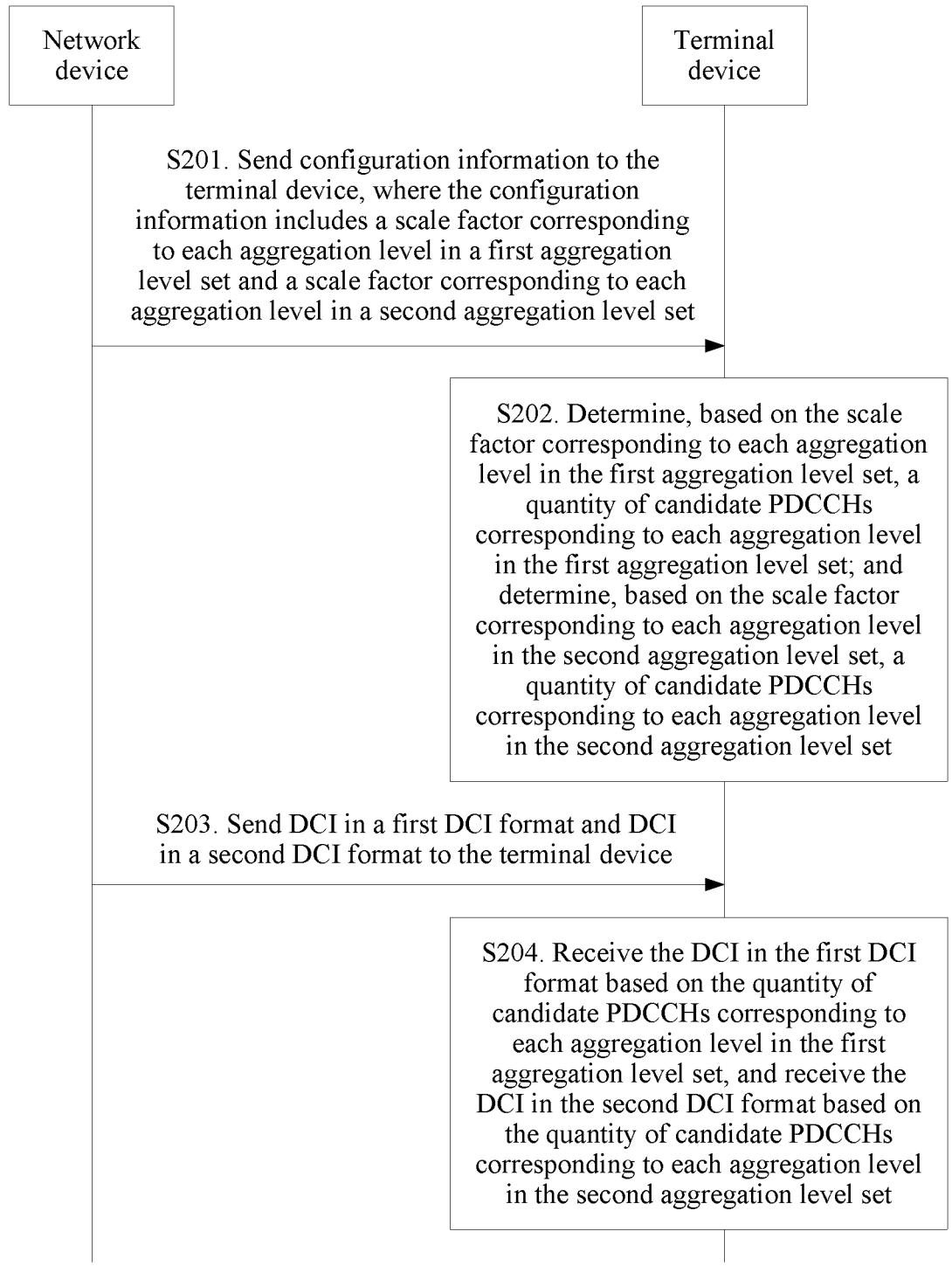
FIG. 3 is a signaling flowchart 2 of a downlink control information transmission method according to an embodiment of this application.

FIG. 3 is a signaling flowchart 2 of a downlink control information transmission method according to an embodiment of this application. As shown in FIG. 3, the method includes the following steps.

S201. A network device sends configuration information to a terminal device, where the configuration information includes a scale factor corresponding to each aggregation level in a first aggregation level set and a scale factor corresponding to each aggregation level in a second aggregation level set.

The first aggregation level set includes n aggregation levels, the first aggregation level set corresponds to a first downlink control information DCI format, and n is a positive integer greater than or equal to 1. The second aggregation level set includes m aggregation levels, the second aggregation level set corresponds to a second downlink control information DCI format, and m is a positive integer greater than or equal to 1. The first DCI format is different from the second DCI format, and the n aggregation levels in the first aggregation level set are the same as the m aggregation levels in the second aggregation level set, or at least one of the n aggregation levels in the first aggregation level set is different from at least one of the m aggregation levels in the second aggregation level set.

S202. The terminal device determines, based on the scale factor corresponding to each aggregation level in the first aggregation level set, a quantity of candidate PDCCHs corresponding to each aggregation level in the first aggregation level set; and determines, based on the scale factor corresponding to each aggregation level in the second aggregation level set, a quantity of candidate PDCCHs corresponding to each aggregation level in the second aggregation level set.

S203. The network device sends DCI in a first DCI format and DCI in a second DCI format to the terminal device.

An aggregation level corresponding to the DCI in the first DCI format is an aggregation level in the first aggregation level set. An aggregation level corresponding to the DCI in the second DCI format is an aggregation level in the second aggregation level set. A person skilled in the art can understand that the aggregation level corresponding to the first DCI format is an aggregation level in the first aggregation level set, and the aggregation level corresponding to the second DCI format is an aggregation level in the second aggregation level set.

S204. The terminal device receives the DCI in the first DCI format based on the quantity of candidate PDCCHs corresponding to each aggregation level in the first aggregation level set, and receives the DCI in the second DCI format based on the quantity of candidate PDCCHs corresponding to each aggregation level in the second aggregation level set.

In a specific implementation process, the terminal device supports two service types. For example, the terminal device supports a URLLC service and an eMBB service. Each service type corresponds to one DCI format. For example, the eMBB service corresponds to the first DCI format, namely, a DCI format X, and the URLLC service corresponds to the second DCI format, namely, a DCI format Y. For the terminal device, the network device determines a first aggregation level set corresponding to the first DCI format and a scale factor corresponding to each aggregation level in the first aggregation level set, and determines a second aggregation level set corresponding to the second DCI format and a scale factor corresponding to each aggregation level in the second aggregation level set. For a specific implementation, refer to the foregoing embodiment. Details are not described herein again in this embodiment.

Optionally, the configuration information further includes information indicating the first aggregation level set and information indicating the second aggregation level set. An implementation of information indicating each aggregation level set is similar to an implementation of the information indicating the first aggregation level set in the embodiment shown in FIG. 2. Details are not described herein again in this embodiment.

In a possible implementation, for the terminal device with the two service types, in an example in which the eMBB service corresponds to the first DCI format, the first DCI format is the format X, and the corresponding scale factor is $P_X$, the first aggregation level set corresponding to the DCI format X and the scale factor corresponding to each aggregation level may be shown in Table 6; and in an example in which the URLLC service corresponds to the second DCI format, the second DCI format is the format Y, and the corresponding scale factor is $P_Y$, the second aggregation level set corresponding to the DCI format Y and the scale factor corresponding to each aggregation level may be shown in Table 7.

TABLE 6

| Aggregation level L | Scale factor $P_X$ |
| --- | --- |
| 1 | $c_0$ |
| 2 | $c_1$ |
| 4 | $c_2$ |
| 8 | $c_3$ |
| 16 | $c_4$ |

Optionally, as described above, for the eMBB service of the two services, in the configuration information, a scale factor corresponding to a higher aggregation level is not greater than a scale factor corresponding to a lower aggregation level, to be specific, $c_0 \geq c_1 \geq c_2 \geq c_3 \geq c_4$.

TABLE 7

| Aggregation level L | Scale factor $P_Y$ |
| --- | --- |
| 2 | $r_1$ |
| 4 | $r_2$ |
| 8 | $r_3$ |
| 16 | $r_4$ |
| 32 | $r_5$ |

Optionally, as described above, for the URLLC service of the two services, in the configuration information, a scale factor corresponding to a lower aggregation level is not greater than a scale factor corresponding to a higher aggregation level, to be specific, $r_1 \leq r_2 \leq r_3 \leq r_4 \leq r_5$.

After receiving the configuration information sent by the network device, the terminal device determines, based on the scale factor corresponding to each aggregation level in the first aggregation level set, the quantity of candidate PDCCHs corresponding to each aggregation level in the first aggregation level set; and determines, based on the scale factor corresponding to each aggregation level in the second aggregation level set, the quantity of candidate PDCCHs corresponding to each aggregation level in the second aggregation level set. In this embodiment, for an implementation in which the terminal device determines, based on the scale factor, the quantity of candidate PDCCHs corresponding to each aggregation level, refer to the foregoing embodiment. Details are not described herein again in this embodiment.

After the network device sends the DCI in the first DCI format and the DCI in the second DCI format to the terminal device, the terminal device receives the DCI in the first DCI format based on the quantity of candidate PDCCHs corresponding to each aggregation level in the first aggregation level set, and receives the DCI in the second DCI format based on the quantity of candidate PDCCHs corresponding to each aggregation level in the second aggregation level set.

According to the downlink control information sending method and the downlink control information receiving method provided in this embodiment, the network device determines, based on two service types of to-be-scheduled data of the terminal device, a first DCI format corresponding to a first service type and a second DCI format corresponding to a second service type. Then, the network device specially determines a first aggregation level set corresponding to the first DCI format, a scale factor corresponding to each aggregation level in the first aggregation level set, a second aggregation level set corresponding to the second DCI format, and a scale factor corresponding to each aggregation level in the second aggregation level set, and sends configuration information to the terminal device. The configuration information includes the scale factor corresponding to each aggregation level in the first aggregation level set and the scale factor corresponding to each aggregation level in the second aggregation level set. The terminal device performs blind detection based on the configuration information to receive DCI in the first DCI format and DCI in the second DCI format, so that aggregation levels corresponding to blind detection and quantities of candidate PDCCHs are specially configured for different services. In this way, a reliability requirement for a control channel of the URLLC service can be ensured, and it can be ensured that a control channel of the eMBB service can be monitored.

Based on the foregoing embodiment, the following describes, by using specific embodiments, an implementation process in which the network device determines the configuration information and an implementation in which the terminal device determines the quantity of candidate PDCCHs based on the configuration information.

An implementation on a network device side is first described. Specifically, the network device determines the configuration information based on search space information and a blind detection capability of the terminal device. The search space information includes an available third aggregation level set and a quantity of available candidate PDCCHs corresponding to each aggregation level in the third aggregation level set. In this embodiment, an implementation of the search space information may be shown in Table 3. For an implementation of the blind detection capability of the terminal device, refer to the foregoing embodiment. Details are not described herein again in this embodiment.

It can be learned from Table 6 and Table 7 that the first aggregation level set and the second aggregation level set are proper subsets of the third aggregation level set. The network device determines, based on the search space information and the blind detection capability of the terminal device, the scale factor corresponding to each aggregation level in the first aggregation level set and the scale factor corresponding to each aggregation level in the second aggregation level set, so that a total quantity of blind detection times of the terminal device is not greater than the blind detection capability of the terminal device.

Optionally, a quantity of candidate PDCCHs of an aggregation level i in the first aggregation level set is an integer determined based on a scale factor corresponding to the aggregation level i and a quantity of candidate PDCCHs corresponding to an aggregation level i in the third aggregation level set, and a quantity of candidate PDCCHs of an aggregation level i in the second aggregation level set is an integer determined based on a scale factor corresponding to the aggregation level i and the quantity of candidate PDCCHs corresponding to the aggregation level i in the third aggregation level set.

In a specific example, the network device determines the scale factor corresponding to the aggregation level in the first aggregation level set and the scale factor corresponding to the aggregation level in the second aggregation level set, so that the scale factors meet a constraint shown in the following formula:

$$\text{round}(c_0 \times M_0) + \text{round}(c_1 \times M_1) + \text{round}(r_1 \times M_1) + \text{round}(c_2 \times M_2) + \text{round}(r_2 \times M_2) + \text{round}(c_3 \times M_3) + \text{round}(r_3 \times M_3) + \text{round}(c_4 \times M_4) + \text{round}(r_4 \times M_4) + \text{round}(r_5 \times M_5) \leq N; \text{ or}$$

$$\lfloor c_0 \times M_0 \rfloor + \lfloor c_1 \times M_1 \rfloor + \lfloor r_1 \times M_1 \rfloor + \lfloor c_2 \times M_2 \rfloor + \lfloor r_2 \times M_2 \rfloor + \lfloor c_3 \times M_3 \rfloor + \lfloor r_3 \times M_3 \rfloor + \lfloor c_4 \times M_4 \rfloor + \lfloor r_4 \times M_4 \rfloor + \lfloor r_5 \times M_5 \rfloor \leq N; \text{ or}$$

$$\lceil c_0 \times M_0 \rceil + \lceil c_1 \times M_1 \rceil + \lceil r_1 \times M_1 \rceil + \lceil c_2 \times M_2 \rceil + \lceil r_2 \times M_2 \rceil + \lceil c_3 \times M_3 \rceil + \lceil r_3 \times M_3 \rceil + \lceil c_4 \times M_4 \rceil + \lceil r_4 \times M_4 \rceil + \lceil r_5 \times M_5 \rceil \leq N.$$

Optionally, the following constraint further needs to be met: A sum of the quantity of candidate PDCCHs corresponding to the aggregation level i in the first aggregation level set and the quantity of candidate PDCCHs corresponding to the aggregation level i in the second aggregation level set is not greater than the quantity of candidate PDCCHs corresponding to the aggregation level i in the third aggregation level set. In other words, a constraint shown in any one of the following formula 4 to formula 6 is met. This constraint means that a quantity of candidate PDCCHs that correspond to an aggregation level L and that are actually to be blindly detected by the terminal device cannot exceed a maximum quantity of candidate PDCCHs of the aggregation level L for the terminal device.

$$M_{real} = \text{round}\{P_X \times M^{(L)}\} + \text{round}\{P_Y \times M^{(L)}\} \leq M^{(L)} \quad \text{Formula 4}$$

$$M_{real} = \lfloor P_X \times M^{(L)} \rfloor + \lfloor P_Y \times M^{(L)} \rfloor \leq M^{(L)} \quad \text{Formula 5}$$

$$M_{real} = \lceil P_X \times M^{(L)} \rceil + \lceil P_Y \times M^{(L)} \rceil \leq M^{(L)} \quad \text{Formula 6}$$

where $M_{real}$ is a total quantity of candidate PDCCHs that actually need to be blindly detected for each aggregation level i, $P_X$ represents the scale factor corresponding to the aggregation level i in the first aggregation level set, $P_Y$ represents the scale factor corresponding to the aggregation level i in the second aggregation level set, $M^{(L)}$ is the quantity of candidate PDCCHs corresponding to the aggregation level i in the third aggregation level set, round { } represents rounding off, ⌊ ⌋ represents rounding down, and ⌈ ⌉ represents rounding up.

For example, the aggregation level is 8, and rounding up is used. In this case, $\lceil c_3 \times M_3 \rceil + \lceil r_3 + M_3 \rceil \leq M_3$ is met. Constraints for other aggregation levels are similar to this. Details are not described herein again in this embodiment.

When the foregoing constraint is met, the blind detection capability of the terminal device is not exceeded, and the quantity of blind detection times of the terminal device is properly allocated. In this way, a reliability requirement for a control channel of the URLLC service can be ensured, and it can be ensured that a control channel of the eMBB service can be monitored.

When the foregoing constraint is met, $0 \leq P_X \leq 1$ and $0 \leq P_Y \leq 1$ further need to be met, and optionally, constraints $c_0 \geq c_1 \geq c_2 \geq c_3 \geq c_4$ and $r_1 \leq r_2 \leq r_3 \leq r_4 \leq r_5$ are further met.

The network device solves, based on the foregoing various constraints, the scale factor corresponding to each aggregation level in the first aggregation level set and the scale factor corresponding to the aggregation level in the second aggregation level set.

In this way, the network device determines the configuration information, and the network device sends the configuration information to the terminal device.

After receiving the configuration information, the terminal device performs blind detection based on the configuration information. In a possible implementation, the configuration information may include content of Table 6 and Table 7 above.

The terminal device determines, based on the configuration information, the quantity of candidate PDCCHs corresponding to each aggregation level in the first aggregation level set, where the quantities are similar to those shown in Table 4, and therefore details are not described herein again in this embodiment. In addition, the terminal device determines, based on the configuration information, the quantity of candidate PDCCHs corresponding to each aggregation level in the second aggregation level set, where the quantities are similar to those shown in Table 5, and therefore details are not described herein again in this embodiment.

When the network device sends the DCI in the first DCI format and the DCI in the second DCI format to the terminal device, the terminal device receives the DCI in the first DCI format based on the quantity of candidate PDCCHs corresponding to each aggregation level in the first aggregation level set, and receives the DCI in the second DCI format based on the quantity of candidate PDCCHs corresponding to each aggregation level in the second aggregation level set.

Optionally, based on the foregoing embodiment, to ensure a reliability requirement for a control channel of the URLLC service and ensure that a control channel of the eMBB service can be monitored, blind detection may be performed only for a format X at a lower aggregation level, and blind detection may be performed only for a format Y at a higher aggregation level. For example, when $c_3 = 0$ and $c_4 = 0$, blind detection is performed at lower aggregation levels (L=1, 2, and 4). When $r_1 = 0$ and $r_2 = 0$, blind detection is performed at higher aggregation levels (L=8, 16, and 32).

Optionally, in this embodiment, for the format X, an implementation of the first aggregation level set may alternatively be shown in Table 1, and for the format Y, an implementation of the second aggregation level set may alternatively be shown in Table 2. In other words, regardless of whether the network device determines one DCI format or determines two DCI formats, an aggregation level set corresponding to the DCI format is always unchanged. When there are two DCI formats, a scale parameter w may be configured by using higher layer signaling, so that a total quantity of blind detection times does not exceed the blind detection capability of the terminal device and the constraints shown in the formula 4 to the formula 6.

In a specific example, when the network device determines a scale factor, the following constraint is met:

$$\text{round}(w \times c_0 \times M_0) + \text{round}(w \times c_1 \times M_1) + \text{round}(w \times r_1 \times M_1) + \text{round}(w \times c_2 \times M_2) + \text{round}(w \times r_2 \times M_2) + \text{round}(w \times c_3 \times M) + \text{round}(w \times r_3 \times M_3) + \text{round}(w \times c_4 \times M_4) + \text{round}(w \times r_4 \times M_4) + \text{round}(w \times r_5 \times M_5) \leq N; \text{ or}$$

$$\lfloor w \times c_0 \times M_0 \rfloor + \lfloor w \times c_1 \times M_1 \rfloor + \lfloor w \times r_1 \times M_1 \rfloor + \lfloor w \times c_2 M_2 \rfloor + \lfloor w \times r_2 M_2 \rfloor + \lfloor w \times c_3 \times M_3 \rfloor + \lfloor w \times r_3 \times M_3 \rfloor + \lfloor w \times c_4 \times M_4 \rfloor + \lfloor w \times r_4 \times M_4 \rfloor + \lfloor w \times r_5 \times M_5 \rfloor \leq N; \text{ or}$$

$$\lceil w \times c_0 \times M_0 \rceil + \lceil w \times c_1 \times M_1 \rceil + \lceil w \times r_1 \times M_1 \rceil + \lceil w \times c_2 M_2 \rceil + \lceil w \times r_2 M_2 \rceil + \lceil w \times c_3 \times M_3 \rceil + \lceil w \times r_3 \times M_3 \rceil + \lceil w \times c_4 \times M_4 \rceil + \lceil w \times r_4 \times M_4 \rceil + \lceil w \times r_5 \times M_5 \rceil \leq N.$$

The terminal device may receive the scale parameter w configured by the network device for the terminal device. The terminal device may obtain, by scaling up and down the scale parameter, the quantity of candidate PDCCHs corresponding to each aggregation level, to perform blind detection.

Optionally, the network device may alternatively configure a first aggregation level scale parameter w1 and a second aggregation level scale parameter w2 for the terminal device, so that a total quantity of blind detection times is performed does not exceed the blind detection capability of the terminal device.

In a specific example, when the network device determines a scale factor, the following constraint is met:

$$\text{round}(w1 \times c_0 \times M_0) + \text{round}(w1 \times c_1 \times M_1) + \text{round}(w2 \times r_1 \times M_1) + \text{round}(w1 \times c_2 \times M_2) + \text{round}(w2 \times r_2 \times M_2) + \text{round}(w1 \times c_3 \times M_3) + \text{round}(w2 \times r_3 \times M_3) + \text{round}(w1 \times c_4 \times M_4) + \text{round}(w2 \times r_4 \times M_4) + \text{round}(w2 \times r_5 \times M_5) \leq N; \text{ or}$$

$$\lfloor w1 \times c_0 \times M_0 \rfloor + \lfloor w1 \times c_1 \times M_1 \rfloor + \lfloor w2 \times r_1 \times M_1 \rfloor + \lfloor w1 \times c_2 \times M_2 \rfloor + \lfloor w2 \times r_2 \times M_2 \rfloor + \lfloor w1 \times c_3 \times M_3 \rfloor + \lfloor w2 \times r_3 \times M_3 \rfloor + \lfloor w1 \times c_4 \times M_4 \rfloor + \lfloor w2 \times r_4 \times M_4 \rfloor + \lfloor 2 \times r_5 \times M_5 \rfloor \leq N; \text{ or}$$

$$\lceil w1 \times c_0 \times M_0 \rceil + \lceil w1 \times c_1 \times M_1 \rceil + \lceil w2 \times r_1 \times M_1 \rceil + \lceil w1 \times c_2 \times M_2 \rceil + \lceil w2 \times r_2 \times M_2 \rceil + \lceil w1 \times c_3 \times M_3 \rceil + \lceil w2 \times r_3 \times M_3 \rceil + \lceil w1 \times c_4 \times M_4 \rceil + \lceil w2 \times r_4 \times M_4 \rceil + \lceil 2 \times r_5 \times M_5 \rceil \leq N.$$

A person skilled in the art can understand that based on the foregoing embodiment, methods for sending and receiving DCI by a terminal device when the terminal device supports two service types are described. When a terminal device supports more than two service types, methods for sending and receiving DCI by the terminal device are similar to those used when the terminal device supports two service types. In other words, both the terminal devices need to meet the following constraints: A total quantity of blind detection times is not greater than the blind detection capability of the terminal device, and for a same aggregation level, a sum of quantities of to-be-blindly-detected candidate PDCCHs corresponding to DCI formats is not greater than a quantity of candidate PDCCHs corresponding to the aggregation level in the search space information.

Optionally, based on the foregoing embodiment, the first aggregation level set or the second aggregation level set may alternatively be the same as the third aggregation level set in terms of aggregation level. In other words, to normalize and unify configurations of the network device, aggregation level sets corresponding to different DCI are the same in form. However, to ensure that the aggregation level sets corresponding to the different DCI are different in essence to enable different DCI formats to correspond to different reliability requirements, in this case, scale factors corresponding to some aggregation levels may be set to relatively small values, for example, directly set to 0.

For example, for the format X, a possible implementation is shown in Table 8.

TABLE 8

| Aggregation level L | Scale factor $P_X$ |
| --- | --- |
| 1 | $a_0$ |
| 2 | $a_1$ |
| 4 | $a_2$ |
| 8 | $a_3$ |
| 16 | $a_4$ |
| 32 | 0 |
| ... | 0 |

It can be learned from Table 8 that the aggregation levels include all available aggregation levels, but a scale factor corresponding to a higher aggregation level is set to a relatively small value, for example, directly set to 0. In other words, no blind detection is to be performed for the higher aggregation level.

For the format Y, a possible implementation is shown in Table 9.

TABLE 9

| Aggregation level L | Scale factor PY |
| --- | --- |
| 1 | 0 |
| 2 | $b_1$ |
| 4 | $b_2$ |
| 8 | $b_3$ |
| 16 | $b_4$ |
| 32 | $b_5$ |

It can be learned from Table 9 that the aggregation levels include all available aggregation levels, but a scale factor corresponding to a lower aggregation level is set to a relatively small value, for example, directly set to 0. In other words, no blind detection is to be performed for the lower aggregation level.

The foregoing mainly describes, from the perspective of interaction between the network device and the terminal device, the solutions provided in the embodiments of this application. It can be understood that to implement the foregoing functions, the network device and the terminal device include corresponding hardware structures and/or software modules for implementing the functions. Units and/or algorithm steps in the examples described with reference to the embodiments disclosed in this application can be implemented by hardware or a combination of hardware and computer software in the embodiments of this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the technical solutions in the embodiments of this application.

In the embodiments of this application, the network device and the terminal device may be divided into function modules based on the foregoing method examples. For example, function modules may be obtained through division based on corresponding functions, or two or more functions may be integrated into one processing module. The integrated module may be implemented in a form of hardware, or may be implemented in a form of a software function module. It should be noted that, in the embodiments of this application, module division is an example and is merely logical function division. In actual implementation, there may be another division manner.

Figure 4:
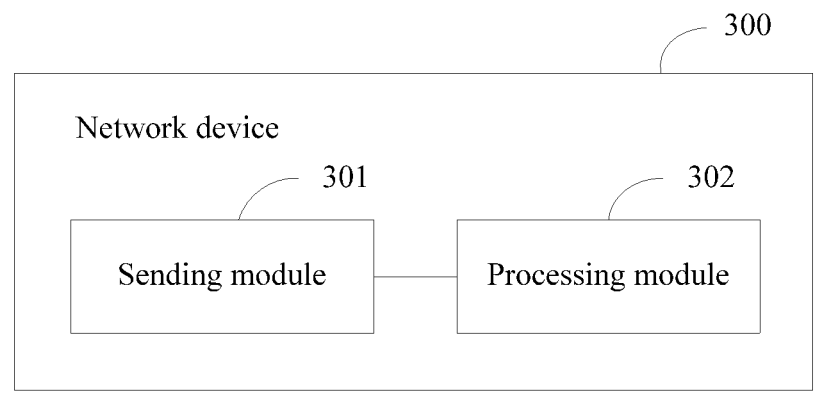
FIG. 4 is a schematic structural diagram of a network device according to an embodiment of this application.

FIG. 4 is a schematic structural diagram of a network device according to an embodiment of this application. As shown in FIG. 4, the network device 300 includes a sending module 301.

The sending module 301 is configured to send configuration information to a terminal device. The configuration information includes a scale factor corresponding to each aggregation level in a first aggregation level set, the first aggregation level set includes n aggregation levels, the first aggregation level set corresponds to a first downlink control information DCI format, n is a positive integer greater than or equal to 1, and the scale factor is used to determine a quantity of candidate physical downlink control channels PDCCHs of the aggregation level corresponding to the scale factor.

The sending module 301 is further configured to send DCI in the first DCI format to the terminal device. An aggregation level corresponding to the DCI in the first DCI format is an aggregation level in the first aggregation level set.

It can be understood that the network device 300 may further include another module such as a processing module 302.

Optionally, the configuration information further includes information indicating the first aggregation level set.

Optionally, the scale factor $P_X$ corresponding to each aggregation level in the first aggregation level set meets $0 \leq P_X \leq 1$, and a scale factor corresponding to a higher aggregation level is not greater than a scale factor corresponding to a lower aggregation level, or a scale factor corresponding to a lower aggregation level is not greater than a scale factor corresponding to a higher aggregation level.

Optionally, the configuration information further includes a scale factor corresponding to each aggregation level in a second aggregation level set, the second aggregation level set includes m aggregation levels, the second aggregation level set corresponds to a second downlink control information DCI format, and m is a positive integer greater than or equal to 1.

The first DCI format is different from the second DCI format, and the n aggregation levels in the first aggregation level set are the same as the m aggregation levels in the second aggregation level set, or at least one of the n aggregation levels in the first aggregation level set is different from at least one of the m aggregation levels in the second aggregation level set.

The sending module 301 is further configured to send DCI in the second DCI format to the terminal device. An aggregation level corresponding to the DCI in the second DCI format is an aggregation level in the second aggregation level set.

Optionally, the configuration information further includes information indicating the second aggregation level set.

Optionally, the scale factor $P_X$ corresponding to each aggregation level in the first aggregation level set meets $0 \leq P_X \leq 1$, and a scale factor corresponding to a higher aggregation level is not greater than a scale factor corresponding to a lower aggregation level.

The scale factor $P_Y$ corresponding to each aggregation level in the second aggregation level set meets $0 \leq P_Y \leq 1$, and a scale factor corresponding to a lower aggregation level is not greater than a scale factor corresponding to a higher aggregation level.

Figure 5:
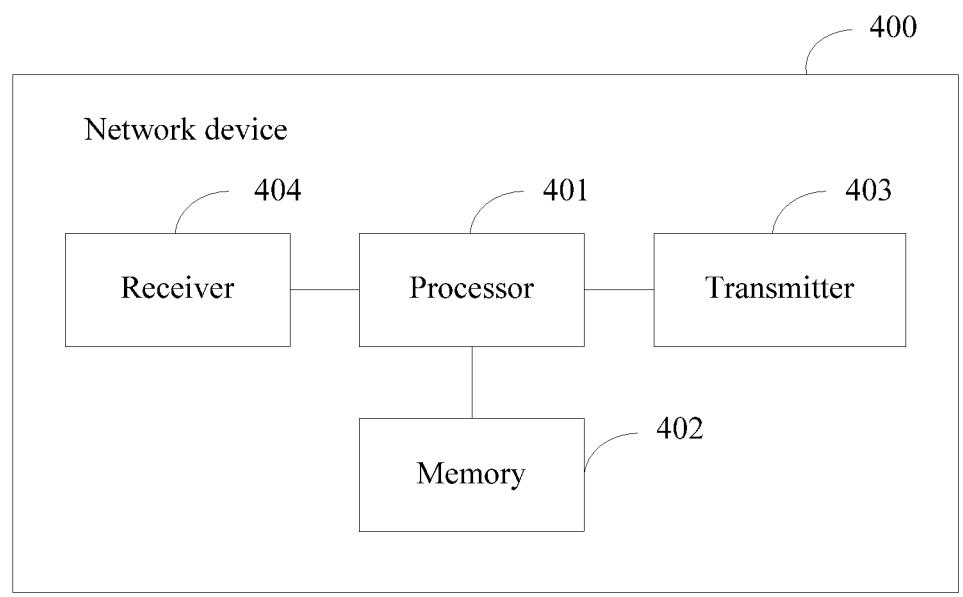
FIG. 5 is a schematic diagram of a hardware structure of a network device according to an embodiment of this application.

In a specific implementation of the foregoing network device, the sending module may be implemented as a transmitter, and data and program code may be stored in a memory, and be controlled and executed by a processor according to a corresponding program instruction. FIG. 5 is a schematic diagram of a hardware structure of a network device according to an embodiment of this application. As shown in FIG. 5, the network device 400 includes: at least one processor 401, a memory 402, and a transmitter 403. Optionally, a receiver 404 is further included. The memory 402 stores a computer execution instruction. The at least one processor 401 executes the computer execution instruction stored in the memory 402, so that the network device 400 can perform the method embodiment described above.

For example, the processor 401 determines configuration information, and the transmitter 403 sends the configuration information to a terminal device. The configuration information includes a scale factor corresponding to each aggregation level in a first aggregation level set, the first aggregation level set includes n aggregation levels, the first aggregation level set corresponds to a first downlink control information DCI format, n is a positive integer greater than or equal to 1, and the scale factor is used to determine a quantity of candidate physical downlink control channels PDCCHs of the aggregation level corresponding to the scale factor.

The transmitter 403 sends DCI in the first DCI format to the terminal device. An aggregation level corresponding to the DCI in the first DCI format is an aggregation level in the first aggregation level set.

The network device provided in this embodiment may perform the foregoing method embodiment. An implementation principle and a technical effect of the network device are similar to those of the foregoing method embodiment. Details are not described herein again.

Figure 6:
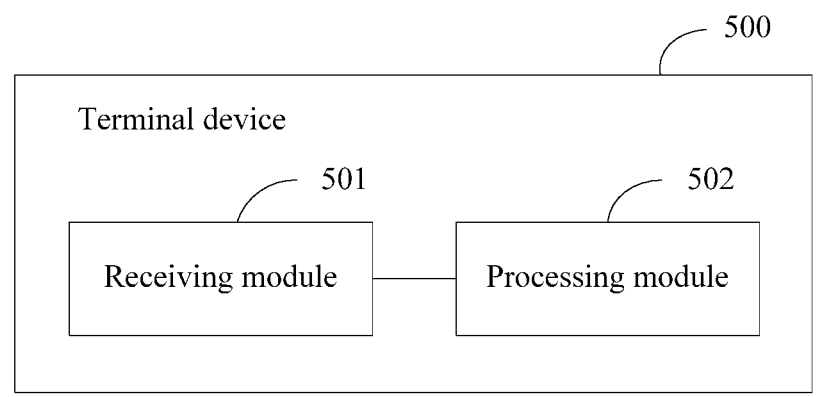
FIG. 6 is a schematic structural diagram of a terminal device according to an embodiment of this application.

FIG. 6 is a schematic structural diagram of a terminal device according to an embodiment of this application. As shown in FIG. 6, the terminal device 500 includes a receiving module 501 and a processing module 502.

The receiving module 501 is configured to receive configuration information sent by a network device. The configuration information includes a scale factor corresponding to each aggregation level in a first aggregation level set, the first aggregation level set includes n aggregation levels, the first aggregation level set corresponds to a first downlink control information DCI format, n is a positive integer greater than or equal to 1, and the scale factor is used to determine a quantity of candidate physical downlink control channels PDCCHs of the aggregation level corresponding to the scale factor.

The processing module 502 is configured to determine, based on the scale factor corresponding to each aggregation level in the first aggregation level set, the quantity of candidate PDCCHs corresponding to each aggregation level in the first aggregation level set.

The receiving module 501 is further configured to receive DCI in the first DCI format based on the quantity of candidate PDCCHs corresponding to each aggregation level in the first aggregation level set.

Optionally, the configuration information further includes information indicating the first aggregation level set.

Optionally, the scale factor $P_X$ corresponding to each aggregation level in the first aggregation level set meets $0 \leq P_X \leq 1$, and a scale factor corresponding to a higher aggregation level is not greater than a scale factor corresponding to a lower aggregation level, or a scale factor corresponding to a lower aggregation level is not greater than a scale factor corresponding to a higher aggregation level.

Optionally, the configuration information further includes a scale factor corresponding to each aggregation level in a second aggregation level set, the second aggregation level set includes m aggregation levels, the second aggregation level set corresponds to a second downlink control information DCI format, and m is a positive integer greater than or equal to 1.

The first DCI format is different from the second DCI format, and the n aggregation levels in the first aggregation level set are the same as the m aggregation levels in the second aggregation level set, or at least one of the n aggregation levels in the first aggregation level set is different from at least one of the m aggregation levels in the second aggregation level set.

The processing module 502 is further configured to determine, based on the scale factor corresponding to each aggregation level in the second aggregation level set, a quantity of candidate PDCCHs corresponding to each aggregation level in the second aggregation level set.

The receiving module 501 is further configured to receive DCI in the second DCI format based on the quantity of candidate PDCCHs corresponding to each aggregation level in the second aggregation level set.

Optionally, the configuration information further includes information indicating the second aggregation level set.

Optionally, the scale factor $P_X$ corresponding to each aggregation level in the first aggregation level set meets $0 \leq P_X \leq 1$, and a scale factor corresponding to a higher aggregation level is not greater than a scale factor corresponding to a lower aggregation level.

The scale factor $P_Y$ corresponding to each aggregation level in the second aggregation level set meets $0 \leq P_Y \leq 1$, and a scale factor corresponding to a lower aggregation level is not greater than a scale factor corresponding to a higher aggregation level.

Figure 7:
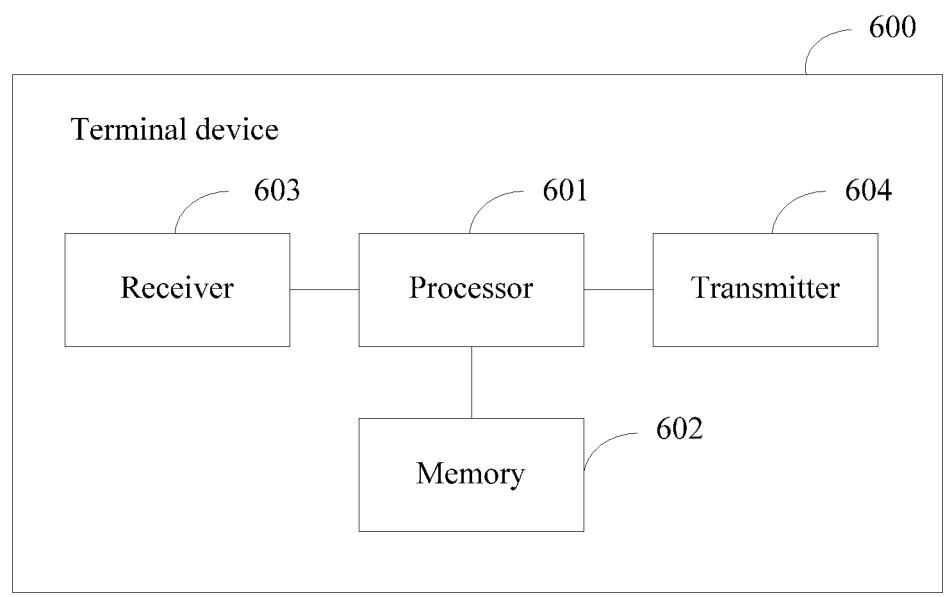
FIG. 7 is a schematic diagram of a hardware structure of a terminal device according to an embodiment of this application.

In a specific implementation of the foregoing terminal device, the receiving module may be implemented as a receiver, the processing module may be implemented as a processor, and data and program code may be stored in a memory, and be controlled and executed by the processor according to a corresponding program instruction. FIG. 7 is a schematic diagram of a hardware structure of a terminal device according to an embodiment of this application. As shown in FIG. 7, the terminal device 600 includes:

at least one processor 601, a memory 602, and a receiver 603. Optionally, a transmitter 604 is further included. The memory 602 stores a computer execution instruction. The at least one processor 601 executes the computer execution instruction stored in the memory 602, so that the terminal device 60o can perform the method embodiment described above.

For example, the receiver 603 receives configuration information sent by a network device. The configuration information includes a scale factor corresponding to each aggregation level in a first aggregation level set, the first aggregation level set includes n aggregation levels, the first aggregation level set corresponds to a first downlink control information DCI format, n is a positive integer greater than or equal to 1, and the scale factor is used to determine a quantity of candidate physical downlink control channels PDCCHs of the aggregation level corresponding to the scale factor.

The processor 601 determines, based on the scale factor corresponding to each aggregation level in the first aggregation level set, the quantity of candidate PDCCHs corresponding to each aggregation level in the first aggregation level set.

The processor 601 controls, based on the quantity of candidate PDCCHs corresponding to each aggregation level in the first aggregation level set, the receiver 603 to receive DCI in the first DCI format.

The terminal device provided in this embodiment may perform the foregoing method embodiment. An implementation principle and a technical effect of the terminal device are similar to those of the foregoing method embodiment. Details are not described herein again.

In addition, an embodiment of this application further provides a computer readable storage medium. The computer readable storage medium stores a computer execution instruction. When at least one processor of a network device executes the computer execution instruction, the network device performs the foregoing various possible downlink control information sending methods.

An embodiment of this application further provides a computer readable storage medium. The computer readable storage medium stores a computer execution instruction. When at least one processor of a terminal device executes the computer execution instruction, the terminal device performs the foregoing various possible downlink control information receiving methods.

In addition, an embodiment of this application further provides a computer program product including an instruction. When the computer program product runs on a network device, the network device performs the foregoing various possible downlink control information sending methods.

An embodiment of this application further provides a computer program product including an instruction. When the computer program product runs on a terminal device, the terminal device performs the foregoing various possible downlink control information receiving methods.

What is claimed is:

1. A method, comprising:
   sending configuration information to a terminal device, wherein the configuration information comprises, for each aggregation level of n aggregation levels in a first aggregation level set, a respective first scale factor corresponding to the respective aggregation level in the first aggregation level set, wherein the first aggregation level set corresponds to a first downlink control information (DCI) format, different aggregation level sets correspond to different DCI formats, n is a positive integer greater than or equal to 1, and each first scale factor comprised in the configuration information is usable to determine a quantity of candidate physical downlink control channels (PDCCHs) of the respective aggregation level corresponding to the respective first scale factor; and
   sending first DCI in the first DCI format to the terminal device, wherein an aggregation level corresponding to the first DCI in the first DCI format is an aggregation level in the first aggregation level set; and
   wherein for each aggregation level in the first aggregation level set the respective first scale factor $P_X$ corresponding to the respective aggregation level meets $0 \leq P_X \leq 1$; and
   wherein:
      a first scale factor corresponding to a higher aggregation level in the first aggregation level set is not greater than a first scale factor corresponding to a lower aggregation level in the first aggregation level set; or
      a first scale factor corresponding to a lower aggregation level in the first aggregation level set is not greater than a first scale factor corresponding to a higher aggregation level in the first aggregation level set.

2. The method according to claim 1, wherein the configuration information further comprises information indicating the first aggregation level set.

3. The method according to claim 1, wherein the configuration information further comprises:

for each aggregation level in a second aggregation level set, a respective second scale factor corresponding to the respective aggregation level in the second aggregation level set, wherein the second aggregation level set comprises m aggregation levels, the second aggregation level set corresponds to a second DCI format, and m is a positive integer greater than or equal to 1;

wherein the first DCI format is different from the second DCI format;

wherein the n aggregation levels in the first aggregation level set are the same as the m aggregation levels in the second aggregation level set, or at least one of the n aggregation levels in the first aggregation level set is different from at least one of the m aggregation levels in the second aggregation level set; and wherein the method further comprises:

sending second DCI in the second DCI format to the terminal device, wherein an aggregation level corresponding to the second DCI in the second DCI format is an aggregation level in the second aggregation level set.

4. The method according to claim 3, wherein the configuration information further comprises information indicating the second aggregation level set.

5. The method according to claim 3, wherein:

for each aggregation level in the second aggregation level set, the respective second scale factor $P_Y$ corresponding to the respective aggregation level meets $0 \leq P_Y \leq 1$, and a second scale factor corresponding to a lower aggregation level in the second aggregation level set is not greater than a second scale factor corresponding to a higher aggregation level in the second aggregation level set.

6. A method, comprising:

receiving configuration information sent by a network device, wherein the configuration information comprises, for each aggregation level of n aggregation levels in a first aggregation level set, a respective first scale factor corresponding to the respective aggregation level in the first aggregation level set, wherein the first aggregation level set corresponds to a first downlink control information (DCI) format, different aggregation level sets correspond to different DCI formats, n is a positive integer greater than or equal to 1, and each first scale factor comprised in the configuration information is usable to determine a quantity of candidate physical downlink control channels (PDCCHs) corresponding to the respective aggregation level that corresponds to the respective first scale factor;

determining, for each aggregation level in the first aggregation level set, the quantity of candidate PDCCHs corresponding to the respective aggregation level in the first aggregation level set, wherein for each aggregation level in the first aggregation level set the quantity of candidate PDCCHs corresponding to the respective aggregation level is determined based on the respective first scale factor corresponding to the respective aggregation level in the first aggregation level set; and receiving first DCI in the first DCI format based on the quantity of candidate PDCCHs corresponding to each aggregation level in the first aggregation level set; and wherein for each aggregation level in the first aggregation level set the respective first scale factor $P_X$ corresponding to the respective aggregation level in the first aggregation level set meets $0 \leq P_X \leq 1$; and wherein:

a first scale factor corresponding to a higher aggregation level in the first aggregation level set is not greater than a first scale factor corresponding to a lower aggregation level in the first aggregation level set; or a first scale factor corresponding to a lower aggregation level in the first aggregation level set is not greater than a first scale factor corresponding to a higher aggregation level in the first aggregation level set.

7. The method according to claim 6, wherein the configuration information further comprises information indicating the first aggregation level set.

8. The method according to claim 6, wherein the configuration information further comprises:

for each aggregation level of m aggregation levels in a second aggregation level set, a respective second scale factor corresponding to the respective aggregation level in the second aggregation level set, wherein the second aggregation level set corresponds to a second DCI format, and m is a positive integer greater than or equal to 1;

wherein the first DCI format is different from the second DCI format; and wherein the n aggregation levels in the first aggregation level set are the same as the m aggregation levels in the second aggregation level set, or at least one of the n aggregation levels in the first aggregation level set is different from at least one of the m aggregation levels in the second aggregation level set; and wherein the method further comprises:

for each aggregation level in the second aggregation level set, determining, based on the respective second scale factor corresponding to the respective aggregation level in the second aggregation level set, a quantity of candidate PDCCHs corresponding to the respective aggregation level in the second aggregation level set; and receiving second DCI in the second DCI format based on the quantity of candidate PDCCHs corresponding to each aggregation level in the second aggregation level set.

9. The method according to claim 8, wherein the configuration information further comprises information indicating the second aggregation level set.

10. The method according to claim 8, wherein:

for each aggregation level in the second aggregation level set, the respective second scale factor $P_Y$ corresponding to the respective aggregation level in the second aggregation level set meets $0 \leq P_Y \leq 1$, and a second scale factor corresponding to a lower aggregation level in the second aggregation level set is not greater than a second scale factor corresponding to a higher aggregation level in the second aggregation level set.

11. An apparatus, comprising:
at least one processor; and
a non-transitory storage medium;
wherein the non-transitory storage medium stores executable instructions that are executable by the at least one processor, the executable instructions including instructions for:
   receiving configuration information sent by a network device, wherein the configuration information comprises, for each aggregation level of n aggregation levels in a first aggregation level set, a respective first scale factor corresponding to the respective aggregation level in the first aggregation level set, wherein the first aggregation level set corresponds to a first downlink control information (DCI) format, different aggregation level sets correspond to different DCI formats, n is a positive integer greater than or equal to 1, and each first scale factor comprised in the configuration information is usable to determine a quantity of candidate physical downlink control channels (PDCCHs) corresponding to the respective aggregation level that corresponds to the respective first scale factor;
   determining, for each aggregation level in the first aggregation level set, the quantity of candidate PDCCHs corresponding to the respective aggregation level in the first aggregation level set, wherein for each aggregation level in the first aggregation level set the quantity of candidate PDCCHs corresponding to the respective aggregation level is determined based on the respective first scale factor corresponding to the respective aggregation level in the first aggregation level set; and
receiving first DCI in the first DCI format based on the quantity of candidate PDCCHs corresponding to each aggregation level in the first aggregation level set; and
wherein for each aggregation level in the first aggregation level set the respective first scale factor $P_X$ corresponding to the respective aggregation level in the first aggregation level set meets $0 \leq P_X \leq 1$; and
wherein:
   a first scale factor corresponding to a higher aggregation level in the first aggregation level set is not greater than a first scale factor corresponding to a lower aggregation level in the first aggregation level set; or
   a first scale factor corresponding to a lower aggregation level in the first aggregation level set is not greater than a first scale factor corresponding to a higher aggregation level in the first aggregation level set.

12. The apparatus according to claim 11, wherein the configuration information further comprises information indicating the first aggregation level set.

13. The apparatus according to claim 11, wherein the configuration information further comprises:
   for each aggregation level of m aggregation levels in a second aggregation level set, a respective second scale factor corresponding to the respective aggregation level in the second aggregation level set, wherein the second aggregation level set corresponds to a second (DCI) format, and m is a positive integer greater than or equal to 1;
   wherein the first DCI format is different from the second DCI format;
   wherein the n aggregation levels in the first aggregation level set are the same as the m aggregation levels in the second aggregation level set, or at least one of the n aggregation levels in the first aggregation level set is different from at least one of the m aggregation levels in the second aggregation level set; and
   wherein the executable instructions further include instructions for:
      for each aggregation level in the second aggregation level set, determining, based on the respective second scale factor corresponding to the respective aggregation level in the second aggregation level set, a quantity of candidate PDCCHs corresponding to the respective aggregation level in the second aggregation level set; and
      receiving second DCI in the second DCI format based on the quantity of candidate PDCCHs corresponding to each aggregation level in the second aggregation level set.

14. The apparatus according to claim 13, wherein the configuration information further comprises information indicating the second aggregation level set.

15. The apparatus according to claim 13, wherein:
   for each aggregation level in the second aggregation level set, the respective second scale factor $P_Y$ corresponding to the respective aggregation level in the second aggregation level set meets $0 \leq P_Y \leq 1$, and a second scale factor corresponding to a lower aggregation level in the second aggregation level set is not greater than a second scale factor corresponding to a higher aggregation level in the second aggregation level set.

* * * * *